July 31, 1934.  W. B. STURGIS  1,968,360

OIL BURNER

Filed Feb. 16, 1929

Inventor:
William B. Sturgis,
By Cromwell, Greist & Warden
Attys.

Patented July 31, 1934

1,968,360

UNITED STATES PATENT OFFICE 1,968,360

OIL BURNER

William B. Sturgis, Chicago, Ill.

Application February 16, 1929, Serial No. 340,410

9 Claims. (Cl. 158—92)

The present invention pertains to oil burners of the type disclosed in my earlier patent applications Serial Nos. 280,241 and 316,480.

One of the objects of the invention is to provide, in an oil burner of the type referred to, novel means for facilitating the starting of the burner, which means, in a preferred embodiment thereof, consists of one or more readily removable heating elements positioned beneath the receptacle in which the oil is vaporized in exposed relation to the air entering such receptacle for admixture with the oil vapor.

Another object is to provide, in such a burner, novel means for effecting the removal of any carbon particles flaking off from the inner walls of the receptacle and dropping down onto the bottom of the same, which means may also be of such a nature as to prevent any substantial accumulation of carbon particles on the bottom of the receptacle.

Still other objects and advantages of the invention will be apparent to those skilled in the art upon a full understanding of the construction, arrangement and operation of the improved oil burner.

One form of the invention is presented herein for the purpose of exemplification, but it will of course be appreciated that the invention is capable of being embodied in various other structurally modified forms coming equally within the scope of the appended claims.

Figure 1:
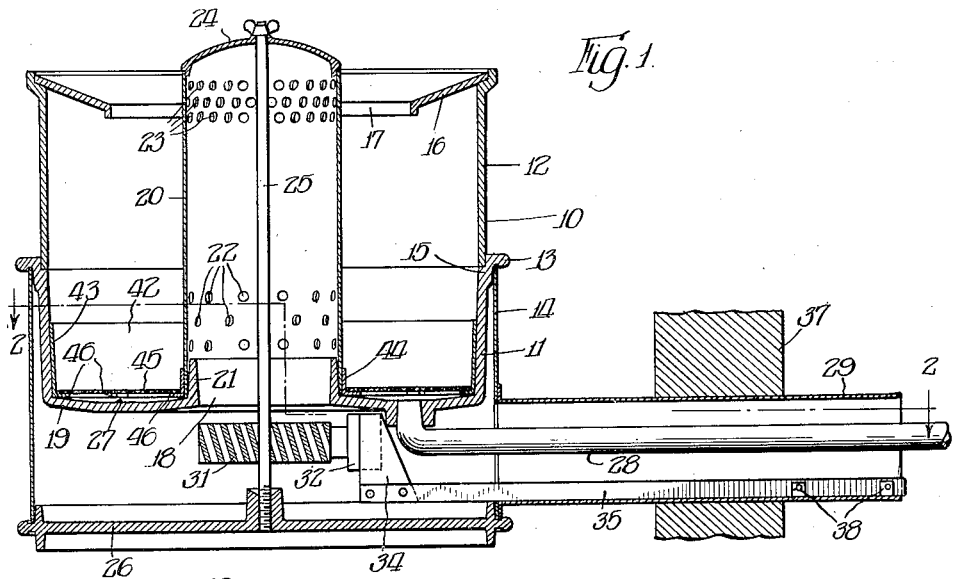
Fig. 1 is a vertical section through an oil burner equipped with the improvements constituting the invention.
Figure 2:
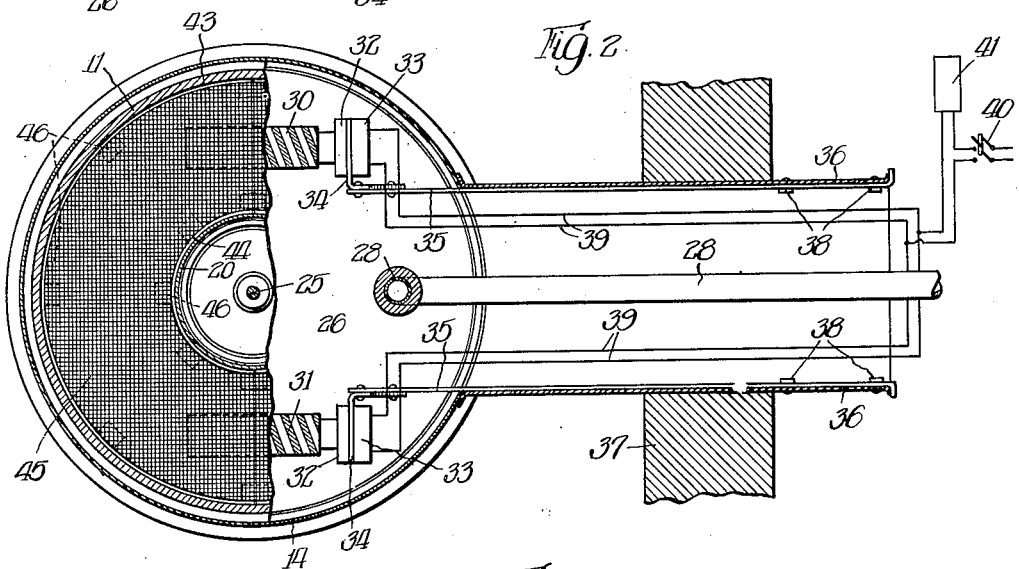
Fig. 2 is a horizontal section through the same, taken on the line 2—2 of Fig. 1.
Figure 3:
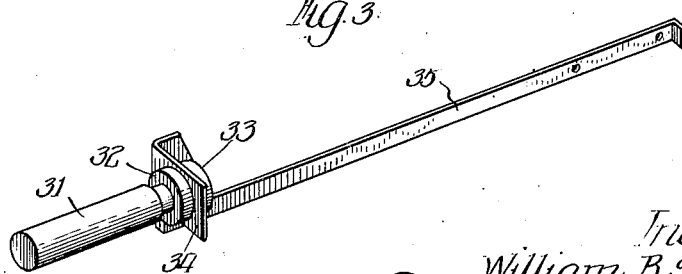
Fig. 3 is a perspective view of one of the removable heating elements.

The oil burner shown in the drawing includes an upwardly opening cast metal receptacle 10 in which the oil is vaporized and mixed with air. The receptacle preferably consists of a pan 11 and a cylinder 12 which forms an upward continuation of the sides of the pan. The pan 11 is suspended by a flange 13 within the upper portion of a casing 14, and the cylinder 12 rests upon the rim 15 of the pan and supports on its upper edge a ring 16, which ring leaves a constricted opening 17 in the top of the receptacle. An aperture 18 is provided in the bottom of the pan, and an upwardly extending tube 20 telescopes over a flange 21 which is formed in the pan about the aperture. The tube 20 contains a lower set of holes 22 and an upper set of holes 23, and is closed at its upper end by a cap 24. A tie rod 25 passes downwardly through the cap 24 and screws at its lower end into a base plate 26 on which the lower edge of the casing 14 is seated, thereby holding together the cap 24, tube 20, pan 11, casing 14 and plate 26.

The oil used in the burner is fed to a shallow trough 27 in the bottom of the pan 11 through a pipe 28, while the air used is conducted to the space below the pan enclosed by the casing 14 by a relatively large duct 29, from which space the air flows upwardly in the tube 20 and passes outwardly through the holes 22 and 23 into the receptacle 10, where it mixes with the upwardly moving vapor formed from the oil in the trough 27 in the bottom of the pan.

Combustion preferably takes place in the constricted annular passageway between the tube and the ring. The upper holes 23 in the tube—which provide the air necessary to effect complete combustion—are preferably so arranged with respect to the inner edge of the ring as to cause such air to thoroughly commingle with and spread the inwardly deflected and consequently rapidly moving mixture of vapor and air constricted by the ring, at a point even with or just above the ring, with the result that an upwardly diverging cone-shaped flame of great intensity is provided about the tube above the ring.

In starting an oil burner of the type under consideration, it ordinarily takes quite a little time for the burner to reach its full heat-developing capacity owing to the fact that when the oil in the bottom of the pan is first ignited the pan is cold and the vaporization is proportionately slow. Furthermore, where an electric spark or gas pilot ignition device is employed, difficulty is frequently experienced in effecting ignition. In the burner shown in the drawing this difficulty is overcome by the employment of two electric heating elements 30 and 31 which are positioned below the pan 11 in the space enclosed by the casing 14. The heating elements are preferably exposed to the air in the course of its passage from the duct 29 to the tube 20 and are preferably arranged closely adjacent to but slightly spaced from the bottom of the trough 27 at diametrically opposite portions of the same whereby to pre-heat the oil standing in the trough and also pre-heat the air flowing thereabout prior to entering the aperture 18 in the pan leading to the tube 20.

While the heating elements 30 and 31 may be of any suitable construction and may be supported in any suitable fashion, they are preferably made in separable base parts 32 and 33 which are screwed together on interposed L-shaped brackets 34 secured to the inner ends of long strips 35 which extend outwardly through the duct 29 at opposite sides of the latter. The outer ends of the strips 35 are detachably secured to the sides 36 of the duct beyond the firebox wall 37 by bolts 38 and, in order to remove one of the heating elements for the purpose of replacement or repair, it is merely necessary to unfasten the bolts 38 which hold the strip carrying that particular heating element, whereupon the heating element may be withdrawn without difficulty by using the strip in association therewith as a supporting handle. The wires for conducting electric current to the filaments of the heating elements are shown schematically at 39, and the circuit of which such wires form a part is designed to be closed by a switch 40 when the burner is to be started. A thermostatically controlled opening switch 41 is included in the same circuit at a point where it will be affected by the heat from the burner when the burner or some area adjacent the same has reached a predetermined temperature, at which time the heat developed by the heating elements 30 and 31 is no longer needed.

In the operation of an oil burner of the type under consideration, it is not unusual for some carbon to collect at one or more places and in time flake off onto the bottom of the receptacle, which carbon, if it is permitted to accumulate to any extent on the bottom of the receptacle, will impair the efficiency of the burner. In the burner shown in the drawing, this is remedied by the insertion within the receptacle of a fine grate member 42 which rests upon the bottom 19 of the pan 11. The grate member 42 may assume any one of a great many different forms, but is preferably in the shape of a basket. The latter consists of an outer sheet metal ring 43 which engages and conforms substantially to the lower portion of the upwardly diverging side wall of the pan 11, an inner relatively short sheet metal ring 44 which surrounds the base of the tube 20, and a wire screen 45 which extends between the lower edges of the rings 43 and 44 and is secured to inturned tongues 46 formed for that purpose on the lower edges of the rings. The carbon particles which flake off from the inner surfaces of the burner are caught on the screen 45, and in order to remove such particles it is merely necessary to lift out the basket. The latter if desired, may be conveniently made in two or more complementary sections. Owing to the trough formation in the bottom 19 of the pan, the screen 45 is slightly spaced from such bottom throughout a considerable portion of its area. As a result of this arrangement the carbon particles which collect on the screen are held in suspension over the film of oil on the bottom of the pan and are consumed during operation of the burner by reason of the heat developed and the circulation of hot oil vapor and air about the same. By utilizing the rings 43 and 44, removal of the basket is facilitated. In addition, starting of the burner is expedited by virtue of the fact that the sheet metal out of which the rings are formed heats more quickly than the cast metal pan 11 and hastens the desired vaporization of the oil on the bottom of the pan.

An oil burner containing one or more of the features of the present invention may be constructed in a greatly reduced size and used merely as an ignition or pilot device in conjunction with a full sized burner of some other type.

I claim:

1. In a burner, the combination of a receptacle having an open top and provided with an air inlet in the bottom thereof, means for delivering liquid fuel over the bottom of the receptacle for vaporization in the receptacle, a casing surrounding the bottom of the receptacle and embodying at one side thereof a laterally extending duct through which air is introduced into the casing for passage to the receptacle via the aforesaid inlet, a heating element for heating the air in the casing and the fuel on the receptacle bottom during starting of the burner, disposed in the casing and located directly beneath the bottom of the receptacle and at one side of the inlet, and a support for said element comprising an elongated strip or arm extending longitudinally through the duct and into the casing.

2. In a burner, the combination of a receptacle having an open top and provided with an air inlet in the bottom thereof, means for delivering liquid fuel over the bottom of the receptacle for vaporization in the receptacle, a casing surrounding the bottom of the receptacle and embodying at one side thereof means forming a laterally extending open-ended duct through which air is introduced into the casing for passage to the receptacle via the aforesaid inlet, an electric heating element for heating the air in the casing and the fuel on the receptacle bottom during starting of the burner, disposed in the casing and located beneath the bottom of the receptacle, and a support for said element comprising an elongated strip or arm extending through and secured removably to the duct-forming means so that it together with the element may be removed bodily through the open end of the duct.

3. In a burner, the combination of a receptacle having an open top and provided with an air inlet in the bottom thereof, means for conducting liquid fuel into the receptacle for vaporization therein, a casing surrounding the bottom of the receptacle and embodying at one side thereof means forming a laterally extending duct through which air is introduced into the casing for passage to the receptacle via the aforesaid inlet, a pair of electric heating elements disposed in the casing and adapted during starting of the burner to preheat the bottom of the receptacle, and the air passing into the receptacle, and a pair of arms for removably supporting the elements extending through the duct-forming means and secured removably to opposite sides thereof.

4. In a burner of the character described, the combination of a receptacle having an open top and provided with an air inlet in the bottom thereof, means for supplying liquid fuel to the receptacle for vaporization therein, a casing surrounding the bottom of the receptacle and embodying at one side thereof a duct through which air is introduced into the casing for passage to the receptacle via the aforesaid inlet, means in the casing for use in preheating the receptacle during starting of the burner, and means for automatically rendering the preheating means inoperative when the space heated by the burner reaches a predetermined temperature.

5. In a burner of the character described, the combination of a receptacle having an open top, means for supplying liquid fuel to the receptacle for vaporization therein, means for conducting air to the receptacle for admixture with the fuel vapor, an electric heating element for use in starting the burner positioned in close proximity to the receptacle and in exposed relation to the air conducted to the latter, a circuit for the heating element, and a thermostatically controlled switch in the circuit arranged to open when the temperature of the space heated by the burner reaches a predetermined temperature.

6. In a burner, the combination of a substantially cylindrical receptacle having an open top, means for supplying liquid fuel to the receptacle for vaporization therein, means for conducting air to the receptacle for admixture with the fuel vapor, and a substantially imperforate ring-shaped, sheet metal strip for use in hastening vaporization of the fuel during starting of the burner, said strip being positioned so that it extends around the inner periphery of the side wall of the receptacle and arranged so that the inner face thereof is exposed to the flame in the receptacle during starting of the burner.

7. In a burner, the combination of a substantially cylindrical receptacle having an open top, means for supplying liquid fuel to the receptacle for vaporization therein, means for conducting air to the receptacle for admixture with the fuel vapor, and a readily removable basket-like structure comprising a perforated bottom and a substantially cylindrical and imperforate side wall, said side wall serving to hasten vaporization of the fuel during starting of the burner and being positioned around the inner periphery of the side wall of the receptacle and in exposed relation with respect to the flame in the receptacle during starting of the burner.

8. In a burner, the combination of a receptacle comprising a bottom and a continuous side wall extending upwardly from the margin of the bottom and having an open top, means for supplying liquid fuel over the bottom of the receptacle for vaporization in the receptacle, an upstanding tube in the central portion of the receptacle having the lower end thereof connected to receive air through the receptacle bottom and embodying means for introducing the air into the receptacle for admixture with the fuel vapor, and a ring-shaped screen extending over the bottom of the receptacle and around the lower end of the tube and adapted to catch particles of carbon, said screen being spaced from the bottom of the receptacle so as to hold the carbon particles in suspension over the fuel for consumption during the operation of the burner and being arranged and constructed so that it may be removed from the receptacle by lifting it through the space between the side wall and the tube and out the open top without disturbing the tube.

9. In a burner, the combination of a receptacle comprising a bottom and a continuous side wall extending upwardly from the margin of the bottom and having an open top, means for supplying liquid fuel into the receptacle for vaporization therein, means for conducting air to the receptacle for admixture with the fuel vapor and a readily removable basket-like structure comprising a bottom for catching carbon particles and an upstanding sheet metal side wall, said last mentioned side wall serving to hasten vaporization of the fuel during starting of the burner and being positioned around the inner face of the side wall of the receptacle and in exposed relation with respect to the flame in the receptacle during starting of the burner.

WILLIAM B. STURGIS.